May 3, 1927.
E. J. BRADY
1,626,664
PROCESS OF PURIFYING ILLUMINATING GAS
Filed Aug. 26, 1921
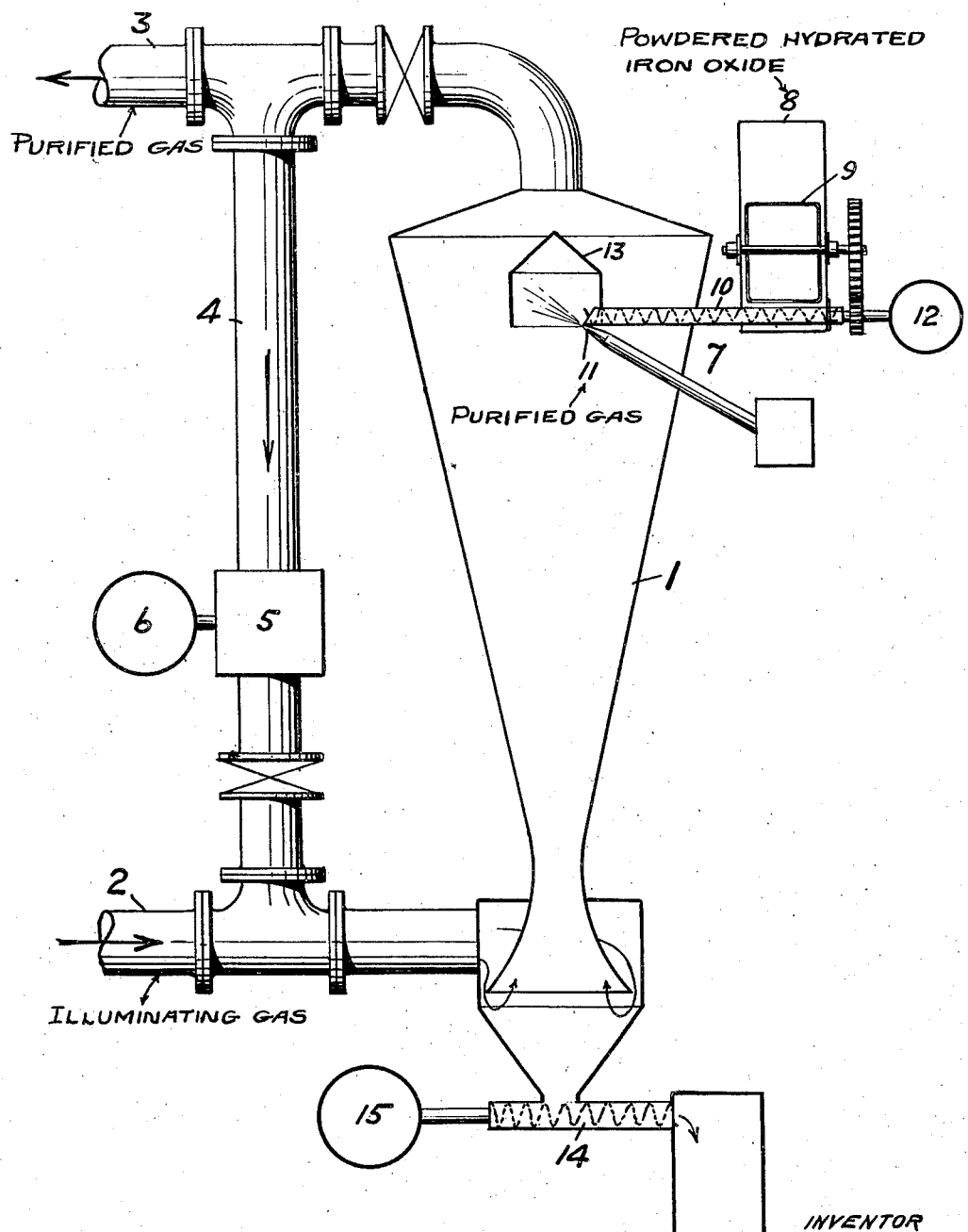
WITNESS:
INVENTOR
Edward J. Brady
BY
ATTORNEY.

Patented May 3, 1927.

1,626,664

UNITED STATES PATENT OFFICE.

EDWARD J. BRADY, OF PHILADELPHIA, PENNSYLVANIA, ASSIGNOR TO THE U. G. I. CONTRACTING COMPANY, OF PHILADELPHIA, PENNSYLVANIA, A CORPORATION OF DELAWARE.

PROCESS OF PURIFYING ILLUMINATING GAS.

Application filed August 26, 1921. Serial No. 495,520.

The purification of illuminating or other gas with powdered or subdivided hydrated iron oxide involves a chemical reaction effected by contact between the solid particles and the fluid.

One object of the present invention is to improve and make more perfect the process of purifying gas.

The invention also comprises the improvements to be presently described and finally claimed.

In the accompanying drawings the application of the invention to the purification of illuminating gas is illustrated but the invention is by no means limited to that application because the invention is of wide application in the arts and industries.

In the drawings 1 is a chamber shown as flaring upwardly and outwardly and in form it may be likened to a Venturi tube. 2 is an inlet connection for gas which is to be purified, and as shown it communicates with the smaller and lower end of the chamber 1. 3 is an off-take pipe which communicates with the chamber 1 as shown at the upper and larger end thereof and the purified gas passes through it. 4 is a by-pass connecting the pipes 2 and 3 and it is provided with a fan or blower 5 driven by a motor 6 and it affords means for keeping the velocity of the gas, flowing to and away from the chamber 1, constant. In the chamber 1, as shown, the velocity of the ascending stream of gas decreases progressively at different levels as the vessel flares from the bottom or inlet 2 toward the top or outlet 3. 7, generally, is a means for introducing hydrated iron oxide in finely divided form to the stream of gas so that the varying particles of the hydrated iron oxide under the influence of gravity may in diffusion seek and find in the stream of gas various positions of retardation at different levels throughout the interior of the chamber 1. The law known among physicists as "Stokes' law" applies in the case of the present invention. As shown this means 7 comprises a hopper 8 having a stirrer 9, the feed screw 10 and the jet 11 which is supplied with purified gas. 12 is a motor for driving the stirrer and the feed screw. 13 is a hood open at the bottom and into which the particles of solid material are discharged by the jet.

The velocity of the stream of fluid decreases at different ascending levels or strata as the stream rises and increases in cross-section, and the particles descend against that stream with varying velocities according to their respective size and mass, and in the descent each particle will reach a respective stratum of fluid of such velocity as to greatly reduce the velocity of the particles and give the required time of and diffusion for contact and the particles in their further descent continually fall to the bottom of the chamber at a rate largely dependent upon the rapidity of the feed and the initial velocity of the stream of fluid. By continuously returning the particles from the bottom to the top or by continuously feeding additional particles to the top and removing those at the bottom the contact reaction may be made continuous.

The conditions above described are particularly favorable for the purification of illuminating and other gas and for the revivification of fouled oxide of iron. In the specific case under description fouled hydrated oxide of iron, descends to the bottom of the chamber 1, from which it may be removed as by the feed screw 14 actuated by the motor 15, for revivification and re-use or other suitable disposal. In the purification of gas the continuity of the contact reaction in the same apparatus is of prime industrial importance.

It will be obvious to those skilled in the art that modifications may be made in details of procedure without departing from the spirit of the invention which is not limited as to those matters or otherwise than as the prior art and the appended claims may require.

I claim:

1. The improvement in the process of purifying gas with subdivided hydrated iron oxide which consists in establishing a stream of gas ascending with decreasing velocity and allowing the finely divided iron oxide to fall by gravity and in coaxial counterflow relation with and through and out at the bottom of said stream, leading off the purified gas, and returning partially fouled oxide to the top of the stream for reuse.

2. The improvement in the process of purifying gas with subdivided hydrated iron oxide which consists in establishing a stream of gas ascending with decreasing velocity and allowing the finely divided iron oxide to fall by gravity and in coaxial counterflow relation with and through and out at the bottom of said stream, and leading off the purified gas.

EDWARD J. BRADY.